(12) United States Patent
Hebert et al.

(10) Patent No.: US 10,958,685 B2
(45) Date of Patent: Mar. 23, 2021

(54) GENERATION OF HONEYPOT DATA

(71) Applicant: SAP SE, Walldorf (DE)

(72) Inventors: Cedric Hebert, Mougins (FR); Anderson Santana de Oliveira, Antibes (FR); Lorenzo Frigerio, Nice (FR)

(73) Assignee: SAP SE, Walldorf (DE)

( * ) Notice: Subject to any disclaimer, the term of this patent is extended or adjusted under 35 U.S.C. 154(b) by 202 days.

(21) Appl. No.: 16/211,802

(22) Filed: Dec. 6, 2018

(65) Prior Publication Data
US 2020/0186567 A1    Jun. 11, 2020

(51) Int. Cl.
*G06F 21/00* (2013.01)
*H04L 29/06* (2006.01)
*G06N 7/00* (2006.01)

(52) U.S. Cl.
CPC ......... *H04L 63/1491* (2013.01); *G06N 7/005* (2013.01); *H04L 63/1416* (2013.01)

(58) Field of Classification Search
CPC ...... G06F 21/554; G06F 21/577; G06F 21/62; G06F 2009/45591; G06F 2009/45595
See application file for complete search history.

(56) References Cited

U.S. PATENT DOCUMENTS 10,574,697 B1 *  2/2020  McClintock ........ H04L 63/1491

* cited by examiner

*Primary Examiner* — Ghazal B Shehni
(74) *Attorney, Agent, or Firm* — Jones Day

(57) ABSTRACT

Data is received that includes a plurality of fields. These fields are modified using at least one differential privacy algorithm to result in fake data. This fake data is subsequently used to seed and enable a honeypot so that access to such honeypot and fake data can be monitored and/or logged. Related apparatus, systems, techniques and articles are also described.

20 Claims, 7 Drawing Sheets

GENERATION OF HONEYPOT DATA

TECHNICAL FIELD

The subject matter described herein relates to techniques for generating data for purposes such as honeypot seeding to thwart cybersecurity attacks.

BACKGROUND

Honeypots are a powerful means to discover what cybersecurity attackers are targeting. However, for honeypots to be effective, they need to appear to have real user data that can be maliciously exploited by an attacker because, if the attacker realizes that it is connected to a decoy machine, its behavior will change accordingly.

Honeypots can be used for different purposes. In system landscapes, they are usually deployed within a computing environment to detect so-called lateral movement, or to spread fake information hopefully of interest to the attacker to spread uncertainty in it goal achievement.

SUMMARY

In one aspect, data is received that includes a plurality of fields. These fields are modified using at least one differential privacy algorithm to result in fake data. This fake data is subsequently used to seed and enable a honeypot so that access to such honeypot and fake data can be monitored and/or logged.

Various types of differential privacy algorithm can be used including generative adversarial networks (GANs) such as dp-GANs.

The modifying can include splitting complex fields within the received data. The received data can be pruned during the modifying to remove duplicate fields. Further, complex fields that were previously split can be rebuilt.

The at least one differential privacy algorithm can utilize a generator to generate new data samples by mapping random noise into new data instances while capturing an original data distribution. A discriminator can also be used that attempts to distinguish the generated new data samples from real data samples. The discriminator can estimate a probability that a particular data sample comes from a training data set rather than the new data samples generated by the generator.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter utilizes differential privacy for purposes of generating honeypot data to thwart a malicious actor. Differential privacy as provided herein allows for diverse anonymization techniques for building usable data for generating honeypot data and/or by running diverse analytics tasks, while removing any user sensitive data. In particular, differential privacy as used herein is for the generation of believable fake data. Believable fake data, for example, can provide some correlation and consistency between and within fields, while, at the same time, minimizing the utility of such data.

Figure 1:
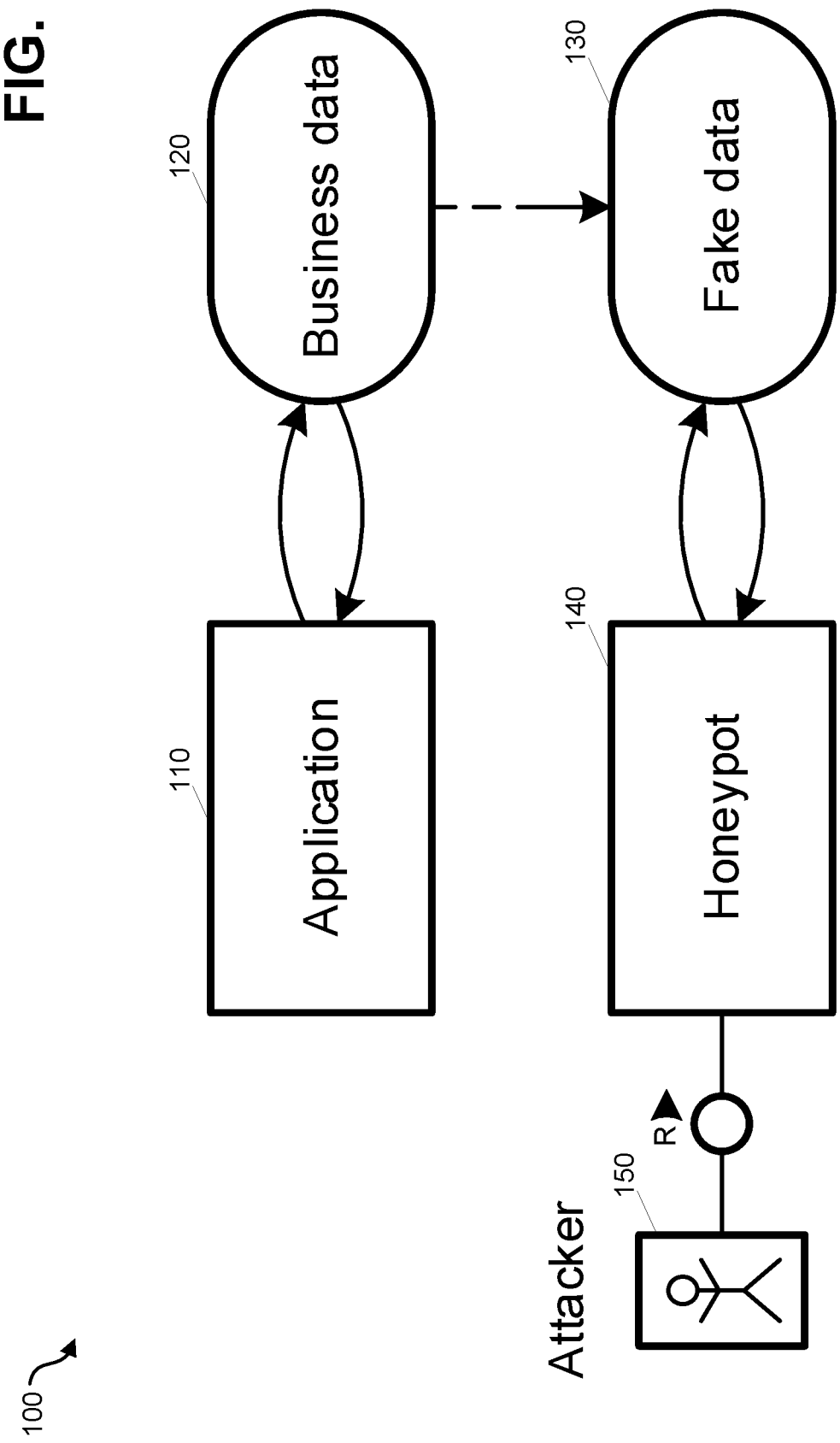
FIG. 1 is a system diagram illustrating a honeypot deployed using fake data.

FIG. 1 is a system diagram 100 illustrating aspects of the current subject matter. An application 110 generates or otherwise utilizes data 120. This data 120 can include or otherwise encapsulate sensitive personnel, financial, competitor information and the like. In an effort to prevent such data from being ultimately accessed by a malicious actor such as attacker 150, the techniques described below can be used to generate fake data 130. This fake data 130 can be seeded into a honeypot 140. The honeypot 140 is a computer security mechanism set to detect, deflect, or, in some manner, counteract attempts at unauthorized use of the data 120 by the attacker 150. As provided below, such fake data 130 needs to be believable in that it is not obviously garbage or otherwise useless to the attacker 150. By having the fake data 130 seeded into the honeypot 140 believable, certain information may be obtained from the attacker (e.g., IP address or other connection information, etc.) which may, in turn, be useful for thwarting future attacks both from the attacker 150 and from other malicious actors.

In particular, one of the uses of the current subject matter is to seamlessly generate fake data, out of a real system, which can be used to populate a honeypot system. Another possible use is to let developers or researchers have access to realistic datasets which can be used for system tuning, demos or development of prototypes, without revealing productive data. The data will be believable in the sense that differential privacy keeps a certain level of coherence with the original dataset. If the original dataset contains for example a high amount of email addresses ending in @sap.com, then the fake data will also contain a representative amount of such emails. This behavior is intended and can be configured via the value of Epsilon depending on the assumptions made about the attacker. Differential privacy might as well generate strange things such as taking an existing @sap.com username and assigning it to another email address, such as @apple.com for example. However, this behavior will not happen very often and, besides the possibility of pruning, such entries could as well pass as either typos or maybe older data.

The following example illustrates one of the problems that the current subject matter can solve. Two database tables called Table 1: User and Table 2: Salary can be defined as follows:

TABLE 1

User

| ID | EMAIL | PASSWORD |
|---|---|---|
| 1 | root@sap.com | C1196C0F709F53E707D72AA06058465E |
| 2 | alice@sap.com | 8C24F146ADE8E05A408E6C88B744A4A8 |
| 3 | bernhard@xyz.fr | 2AB96390C7DBE3439DE74D0C9B0B1767 |
| 4 | michel.saga@trnds.uk | 8A7EFF999752BDE13D00A4B8F14F64B4 |
| 5 | x23uds@jetable.com | F74AED0BDC047A0308CDD50614666433 |

TABLE 2

Salary

| ID | FIRST NAME | LAST NAME | SALARY |
|---|---|---|---|
| 1 | cedric | hebert | 103765 |
| 2 | alice | caterpilar | 87412 |
| 3 | sarah | bernhard | 93422 |
| 4 | michel | saga | 85601 |
| 5 | antoine | desmares | 57600 |

Table 1: User contains an identifier, which links the user account with the corresponding salary; the user's emails, used as login, and the hash of the passwords.

Table 2: Salary contains the ID linking to the user table, the first name, last name, and salary in Euro of the user.

The fake data generated using the current techniques is realistic without revealing private and/or potentially protected information. For example, having salaries ten times lower or higher than the real ones will be highly suspicious or look plain wrong to the attacker. However, keeping the data values close to the real values might leak information to the attacker, for example the company's salary mid-range. With differential privacy as provided herein, a high level of noise can be configured or otherwise injected into the data set.

Further, the current techniques also can be arranged so as not to reveal sensitive information. Specifically, the techniques used herein can ensured that certain data does not appear at all, anytime. For example, password hashes should not be present. As will be described in further detail below, an 'xor' strategy can be adopted thereby replacing elements with others, making sure the initial element cannot appear at all in the fake data set.

The current subject matter also provides that the output of the algorithms is coherent, while protecting private or protected data. For example, information such as emails, first and last names shall not be disclosed up to a certain limit. In one variation, the current techniques can rely on lists from which information can be replaced. For example, first names can be replaced by first names coming from a common list, however very common names (or names which appear a lot in the real data set) can continue to appear.

The current subject matter also ensures that the data remains coherent. In particular, the underlying data should remain coherent, despite information replacements: if for example an email is based off a first name and last name, replacing the user's first name should not make the email incoherent.

Also, with regard to honeypots, the current subject matter creates data that does not reveal sensitive information if hacker discovers that it is a honeypot. In particular, an attacker understanding the way the data was built may assume that the real data is the complement to the available data. If a certain common last name is not present, the attacker might assume that the name was part of the original dataset.

Simply generating random data for these Tables 1 and 2 will break the correlation between user ID and salary ID, between email and first name/last name (for example between alice@sap.com and Alice Caterpilar), and might render the salaries unrealistic (for example a user having a total salary of 100 Eur).

Applying differential privacy as provided herein can generate a dataset where correlations are kept up to a certain degree, defined by the parameters of the algorithm. However, care needs to be taken to protect certain data element such as password hashes. In particular, the current subject matter can ensure that hashed passwords are not simply decorrelated from their respective user as such hashed passwords can still provide critical information to a malicious actor.

The current subject matter enhances the approach of differential privacy for fake data generation, by ensuring consistency among the generated noise, by removing elements which should never appear in the final dataset and by doing some data cleanup for avoiding duplicates.

In one implementation, a dataset can be prepared in order to train an agent to generate fake data. Once such agent (i.e., generator) is created, it can be used at honeypot generation time to populate such database with fake data.

Figure 2:
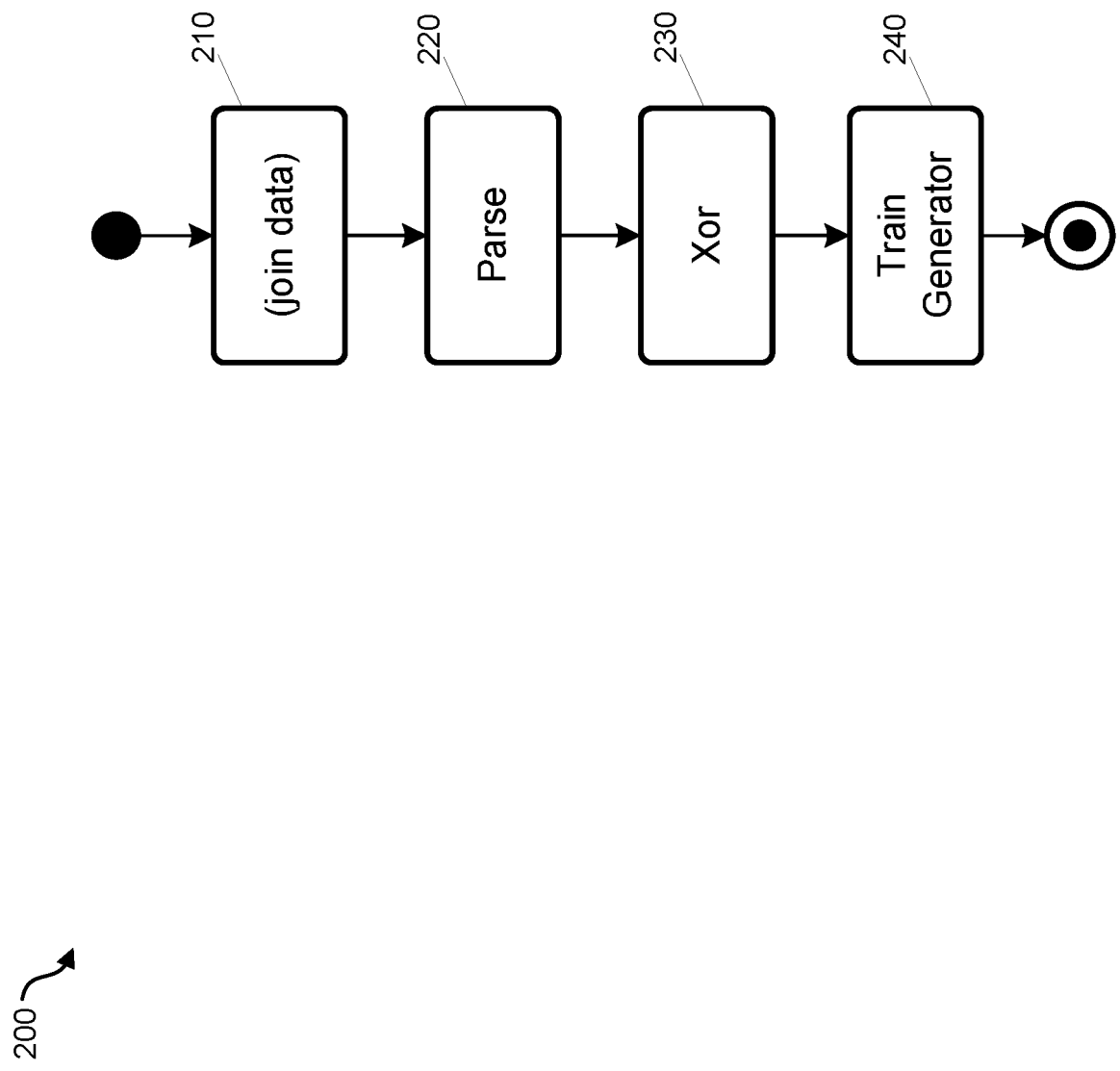
FIG. 2 is a first process flow diagram illustrating aspects of generating fake data.

FIG. 2 is a process flow diagram 200 illustrating aspects associated with training an agent to generated fake data. Initially, at 210, a 'join data' operation can be performed which can be characterized as a preparation step, depending on the scenario and may or may not be relevant for the data at hand. As an illustrative example, it is desirable to maintain the correlation between users and salaries, so the example tables can be joined as illustrated in Table 3.

TABLE 3

| ID | EMAIL | PASSWORD | FIRST NAME | LAST NAME | SALARY |
|---|---|---|---|---|---|
| 1 | root@sap.com | C1196C0F709F53E707D72AA06058465E | cedric | hebert | 103765 |
| 2 | alice@sap.com | 8C24F146ADE8E05A408E6C886744A4A8 | alice | caterpilar | 87412 |
| 3 | bernhard@xyz.fr | 2AB96390C7DBE3439DE74D0C9B0B1767 | sarah | bernhard | 93422 |
| 4 | michel.saga@trnds.uk | 8A7EFF999752BDE13D00A4B8F14F6464 | michel | Saga | 85601 |
| 5 | x23uds@jetable.com | F74AED0BDC047A0308CDD50614666433 | antoine | desmares | 57600 |

A second operation 220, 'parse fields' can include identifying the content of complex columns, and in making sure that repeated elements (such as a last name in an email) are no longer repeated. Here, it will be recognized, based on the complete list of fields, that the email contains several types of data (username, company, first name, last name). The resulting dataset will now be as provided in Table 4.

TABLE 4

| ID | EMAIL | USERNAME | COMPANY | PASSWORD | FIRST NAME | LAST NAME | SALARY |
|---|---|---|---|---|---|---|---|
| 1 | <username>@<company> | root | sap.com | C1196C0F709F53E707D72AA06058465E | cedric | Hebert | 103765 |
| 2 | <first name>@<company> | | sap.com | 8C24F146ADE8E05A408E6C88B744A4A8 | alice | Caterpillar | 87412 |
| 3 | <last name>@<company> | | xyz.fr | 2AB96390C7DBE3439DE74D0C9B0B1767 | sarah | Bernhard | 93422 |
| 4 | <first name>.<last name>@<company> | | trnds.uk | 8A7EFF999752BDE13D00A4B8F14F64B4 | michel | Saga | 85601 |
| 5 | <username>@<company> | x23uds | jetable.com | F74AED0BDC047A0308CDD50614666433 | antoine | Desmares | 57600 |

A third operation 230 'xor' can replace (based on a configuration file bound to each field) certain fields with content which does not appear in the database. This action relies on predefined datasets, which are referred to herein as 'universes' and which are described in further detail below. Again, with this example, all password hashes, leading to the following new dataset as provided in Table 5.

TABLE 5

| ID | EMAIL | USERNAME | COMPANY | PASSWORD | FIRST NAME | LAST NAME | SALARY |
|---|---|---|---|---|---|---|---|
| 1 | <username>@<company> | root | sap.com | 8775E7E7D58389 25FA56DBC25AA EE616 | cedric | Hebert | 103765 |
| 2 | <first name>@<company> | | sap.com | A49137B67E0E26 47A03396581A3 506EA | Alice | caterpillar | 87412 |
| 3 | <last name>@<company> | | xyz.fr | 5538E9218896D 20F5B69BFB2156 621AC | Sarah | bernhard | 93422 |
| 4 | <first name>.<last name>@<company> | | trnds.uk | F4180E6FC6ECEC D42059AFB37A3 F9CCA | michel | saga | 85601 |
| 5 | <username>@<company> | x23uds | jetable.com | 571D42260B4FB 05E245ECB32D0 BD9CE7 | antoine | desmares | 57600 |

A fourth operation 240, 'train generator' can comprises applying differential privacy to our dataset defined in the previous operation 230. The system can train a data generator, which will be augmented by universes (like with the xor step) for generating believable data. The universes can allow the generation of completely fake data (such as users which do not exist) and can protect the numerical values (such as the salary) by randomizing the values in a well, differential-private way. The higher the level of privacy, the higher the randomness of the individual values. With such actions the generator is trained so that any number of entries can be output.

Figure 3:
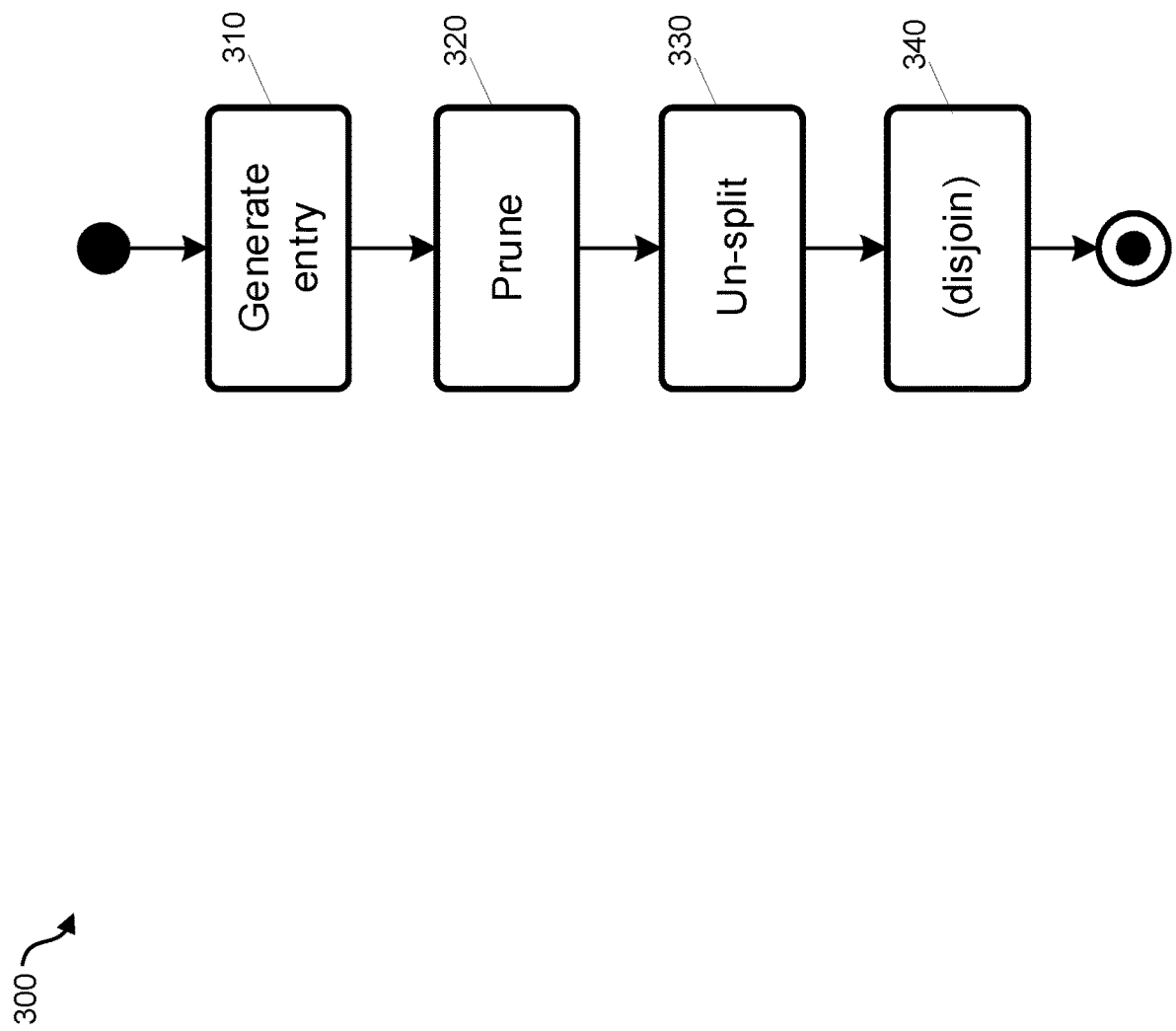
FIG. 3 is a second process flow diagram illustrating aspects of generating fake data.

FIG. 3 is a diagram 300 illustrating aspects relating to the population, for example, of a honeypot. Initially, as part of a 'generate entry' operation 310, the generator will output lines of fake data. However, it may happen that the generator spits certain entries several times, which would cause a consistency issue in a database or tip-off an attacker of something going wrong. For example, let's assume that the generator outputs the following 6 lines (one at a time) as provided in Table 6.

TABLE 6

| ID | EMAIL | USERNAME | COMPANY | PASSWORD | FIRST NAME | LAST NAME | SALARY |
|---|---|---|---|---|---|---|---|
| 1 | <first name>@<company> | | sap.com | A49137B67E0E2647A03396581A3506EA | harriet | Markovich | 81492 |
| 2 | <last name>@<company> | | xyz.fr | 5538E9218896D20F5B69BFB2156621AC | sarah | Bernhard | 96677 |
| 3 | <username>@<company> | x23uds | jetable.com | 571D42260B4FB05E245ECB32D0BD9CE7 | alice | Conforti | 46310 |
| 4 | <last name>@<company> | | xyz.fr | 5538E9218896D20F5B69BFB2156621AC | sarah | Bernhard | 96754 |
| 5 | <username>@<company> | Root | sap.com | 8775E7E7D5838925FA56DBC25AAEE616 | donald | Weir | 105006 |
| 6 | <first name>.<last name>@<company> | | trnds.uk | F4180E6FC6ECECD42059AFB37A3F9CCA | lee | Smith | 94218 |

It will be noted that line 2 of Table 6 contains an existing user, which is acceptable because the attacker will expect known users to be in the database (for example, if the actor discovered that person by exploring a corporate directory or social media website). This inclusion of misleading information is an intended behavior. However, line 4 of Table 6 is about the same user (same first name and last name), which is a duplicate.

A second operation 'prune' 320 can take care of detecting such entries (by looking in the fake database whether this user already exists) and can discard the duplicates. Such deletions will simply require another entry to be generated, until there are an expected amount of entries in the fake database.

The pruned dataset, if it was stored directly, would now look like Table 7 below.

TABLE 7

| ID | EMAIL | USERNAME | COMPANY | PASSWORD | FIRST NAME | LAST NAME | SALARY |
|---|---|---|---|---|---|---|---|
| 1 | <first name>@<company> | | sap.com | A49137B67E0E2647A03396581A3506EA | harriet | Markovich | 81492 |
| 2 | <last name>@<company> | | xyz.fr | 5538E9218896D20F5B69BFB2156621AC | sarah | bernhard | 96677 |
| 3 | <username>@<company> | x23uds | jetable.com | 571D42260B4FB05E245ECB32D0BD9CE7 | alice | conforti | 46310 |
| 4 | <username>@<company> | root | sap.com | 8775E7E7D5838925FA56DBC25AAEE616 | donald | weir | 105006 |
| 5 | <first name>.<last name>@<company> | | trnds.uk | F4180E6FC6ECECD42059AFB37A3F9CCA | lee | smith | 94218 |

A third operation 330 'tin-split' can provide for reverting the complex fields parsed during the 'parse' step. Each line reaching this step can be re-built according to the original fields, which would give this on the complete dataset as in Table 8.

TABLE 8

| ID | EMAIL | PASSWORD | FIRST NAME | LAST NAME | SALARY |
|---|---|---|---|---|---|
| 1 | harriet@sap.com | A491371367E0E2647A03396581A3506EA | harriet | Markovich | 81492 |
| 2 | bernhard@xyz.fr | 5538E9218896D20F5669BFB2156621AC | sarah | Bernhard | 96677 |
| 3 | x23uds@jetable.com | 571D42260B4FB05E245ECB32D0BD9CE7 | alice | conforti | 46310 |
| 4 | root@sap.com | 8775E7E7D5838925FA56DBC25AAEE616 | donald | weir | 105006 |
| 5 | lee.smith@trnds.uk | F4180E6FC6ECECD42059AFB37A3F9CCA | lee | smith | 94218 |

A fourth operation 340 'disjoin' can be the reverse of the 'join data' step, and can be about splitting our data into their respective tables, leading to the following final result as in Table 9 and Table 10.

TABLE 9 user

| ID | EMAIL | PASSWORD |
|---|---|---|
| 1 | harriet@sap.com | A491371367E0E2647A03396581A3506EA |
| 2 | bernhard@xyz.fr | 5538E9218896D20F5669BFB2156621AC |
| 3 | x23uds@jetable.com | 571D42260B4FB05E245ECB32D0BD9CE7 |
| 4 | root@sap.com | 8775E7E7D5838925FA56DBC25AAEE616 |
| 5 | lee.smith@trnds.uk | F4180E6FC6ECECD42059AFB37A3F9CCA |

TABLE 10 salary

| ID | FIRST NAME | LAST NAME | SALARY |
|---|---|---|---|
| 1 | Harriet | Markovich | 81492 |
| 2 | Sarah | Bernhard | 96677 |
| 3 | Alice | Conforti | 46310 |
| 4 | Donald | Weir | 105006 |
| 5 | Lee | Smith | 94218 |

Operations 'xor' 230 and 'train generator' 240 can be bound to the concept of universes. Further information is provided below with regard to universes are and how they are being built.

Universes are dictionaries bound to certain fields. For first names, the corresponding universe will be a set list of predefined first names, preferably big. Same for last names. Password hashes will be linked to a password hash generator: a small tool able to generate 32-character strings composed of characters 0 to 9 and A to F. Same for username, which will be linked to a random string generator. In some cases, email and salary, respectively complex types might not be matched to any universe.

Universes can be used, for example, for two operations: 'xor' 230 and 'train generator' 240. In the 'xor' operation 230, each entry of the field can be replaced by an entry of the universe which is not in the original database. In the example above, xor can be applied to the password field. It is desirable for the user's password hashes to be absent in the fake database and, at the same time, ensuring that the real password hash of a user is not inadvertently stored in the fake database.

In the 'train generator' dataset (by way of operation 240), the pool of entries can be enriched from what is in the database to something broader.

Each field can be assigned a strategy: xor, complete, or none. In this example, the following strategies can be adopted:

Username: xor
Company: complete
Password: xor
First name: complete
Last name: complete
Salary: none The field marked as 'none' are not assigned any universe. A universe for each of the 'xor' fields and for each of the 'complete' fields can be prepared as follows:

Complete. A pool of candidates can be created based on the union between this universe and the current set of fields. For first names, if the universe is antony, antoine, carlos, michel, marcel, sarah, then the pool will be: alice, antony, antoine, carlos, cedric, michel, marcel, sarah.

Xor. A pool of candidates can be created based on the universe minus the current set of fields. For first names, taking the same universe antony, antoine, carlos, michel, marcel, sarah, then the pool will be: antony, carlos, marcel. This may not be very useful for first names, but can be a good strategy for password hashes, where it is desirable not to accidentally leave a valid password hash in the resulting dataset.

Figure 4:
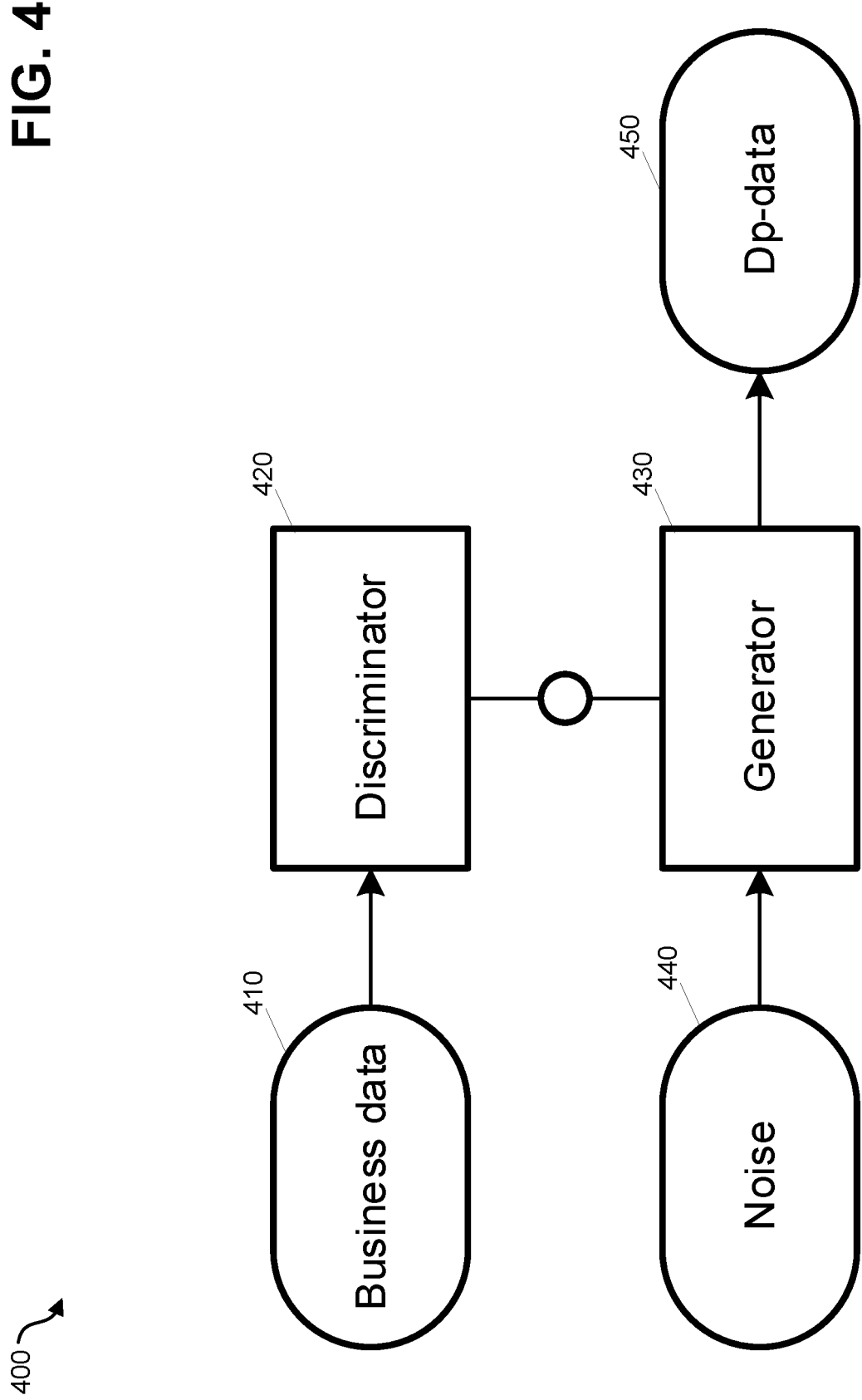
FIG. 4 is a third process flow diagram illustrating aspects of generating fake data.

FIG. 4 is a diagram 400 illustrating an example computing architecture for processing the data as in the examples provided herein. With this example, DP-GAN is used for generating the fake data. Please provide further information regarding DP-GAN. While DP-GAN is provided for illustration purposes, other differential privacy algorithms/techniques can be used such as PrvBayes, PrivKagr, and more.

The data (the initial dataset) 410 can be the actual data we want to derive anonymized data from, for displaying in our honeypot. The data 410 can be stored locally and/or in a remote database/data source (accessible via a direct connection and/or over a computer network). The noise 440 can be a component providing random or pseudorandom input to a generator 430. The generator 430 can be a machine-learning powered agent generating data which gets stored into the DP-data storage 450. Given an initial dataset, in one example, data 410, a GAN is able to mimic its data distribution, for that, a GAN employs two different networks: a generator and a discriminator. The architecture of the two networks is independent from the definition of GAN; based on the application different network configurations can be used.

The role of the generator is to map random noise into new data instances capturing the original data distribution. On the contrary the discriminator tries to distinguish the generated samples from the real ones estimating the probability that a sample comes from the training data rather than the generator. In this way, after each iteration the generator becomes better at generating realistic samples, while the discriminator becomes increasingly able to tell apart the original data from the generated ones. Since the two networks play against each other, the two losses will not converge to a minimum like in a normal training process but this minmax game has its solution in the Nash equilibrium.

A discriminator 420 can read dp-data and inform the generator 440 if it can detect the difference with the data 410. This, in some cases, can be achieved with the help of a machine learning classifier that is the most suitable for the data at hand. The classifier can be trained on real data and predict cases from the fake data from the generator. The loss result from this process is then used for input in the next iteration by the generator. Based on the feedback from the discriminator 420, the generator 440 can alter the way it generates data, until the discriminator 420 is not anymore able to tell whether data from Dp-data storage 450 is real or not.

The dp-GAN model can include two networks, a generator and a discriminator, that can be modeled based on the application domain. In one example, Long Short Term Memories (LSTM) inside the generator to model streaming data and Fully Connected Networks (FCN) to model discrete data. At the end of the training, the generator network can be publicly released; in this way, the analyst can generate new datasets as needed. Moreover, because the generator only maps noise into new data the process is fast and data can be generated on the fly when a new analysis is required. We used the differentially private Stochastic Gradient Descent (dp-SGD) proposed by to train the discriminator network and the Adam optimizer to train the generator. The dp-GAN implementation can rely on training in which the gradients computed for the discriminator are altered. This is due to the fact that it is desirable to limit the influence that each sample has on the model. On the contrary, the training of the generator remains unaltered; indeed, this network bases its training only on the loss of the discriminator without accessing directly the data and therefore increase privacy costs. The approach is independent from the chosen loss and therefore can be applied to both GAN and WGAN approaches. The dp-SGD works as follows: once the gradients are calculated, it clips them by a threshold C and alter them by the addition of a random noise with variance proportional to the C parameter. Each time an iteration is performed, the privacy cost increases and the objective is to find a good balance between data utility and privacy costs. Our implementation constitutes an extension to the improved WGAN framework combining it with the dp-SGD. Therefore, the loss functions are calculated as in a normal WGAN implementation and only the computed gradients are altered to guarantee privacy.

At this point, the generator 440 can be used to produce an arbitrary amount of data having the property of being differentially private from the initial data 410, without having seen the actual data anytime. One of the advantages of dp-GAN enabled generator 440 is that once it has been properly trained, it can generate any amount of required data in a very quick manner.

The generator 440 can be configured so that it can generate believable data, according to two parameters. A first parameter, called Epsilon, can define the level of privacy. A high value for Epsilon, such as 10, means very low privacy. In a sense, the generated data by the generator 440 will be almost the same as the original one. A very low value for Epsilon, such as $10^{-5}$, means very high privacy: the generated data will make each individual record very private, by altering a lot the value of the salary, by replacing the last name with the last name of another person, etc., scrambling the data.

A second parameter addresses data normalization. The goal of differential privacy as provided by the generator 440 is to make each entry private but keep a certain level of consistency among the full dataset, enabling, for example, to keep the salary average untouched. With the normalization parameters, this behavior can be changed in order to make this average value skewed to some extent. Skew it too much though and the attacker might realize that the data is fake. In certain cases, for example for salaries, where the attacker might have a good idea of the amounts to expect, the data can be slightly de-normalized, where in other cases, such as the value of sells margins, which should be a secret to most persons, the de-normalization can be set to a higher level. Data normalization can be expressed as data ranges and other constraints easily implemented in a data manipulation language such as SQL or other (depending on the concrete deployment scenario). These can be defined according to the use case at hand in order to protect data and to prevent any information that is considered sensitive.

With some variations, the generator 440 can be limited in that it is not able to 'invent' new names and will keep recycling the ones it has, same for the password hashes. The generator 440 might also generate incoherent data, such as assigning email alice@sap.com to a person which is not named Alice.

Figure 5:
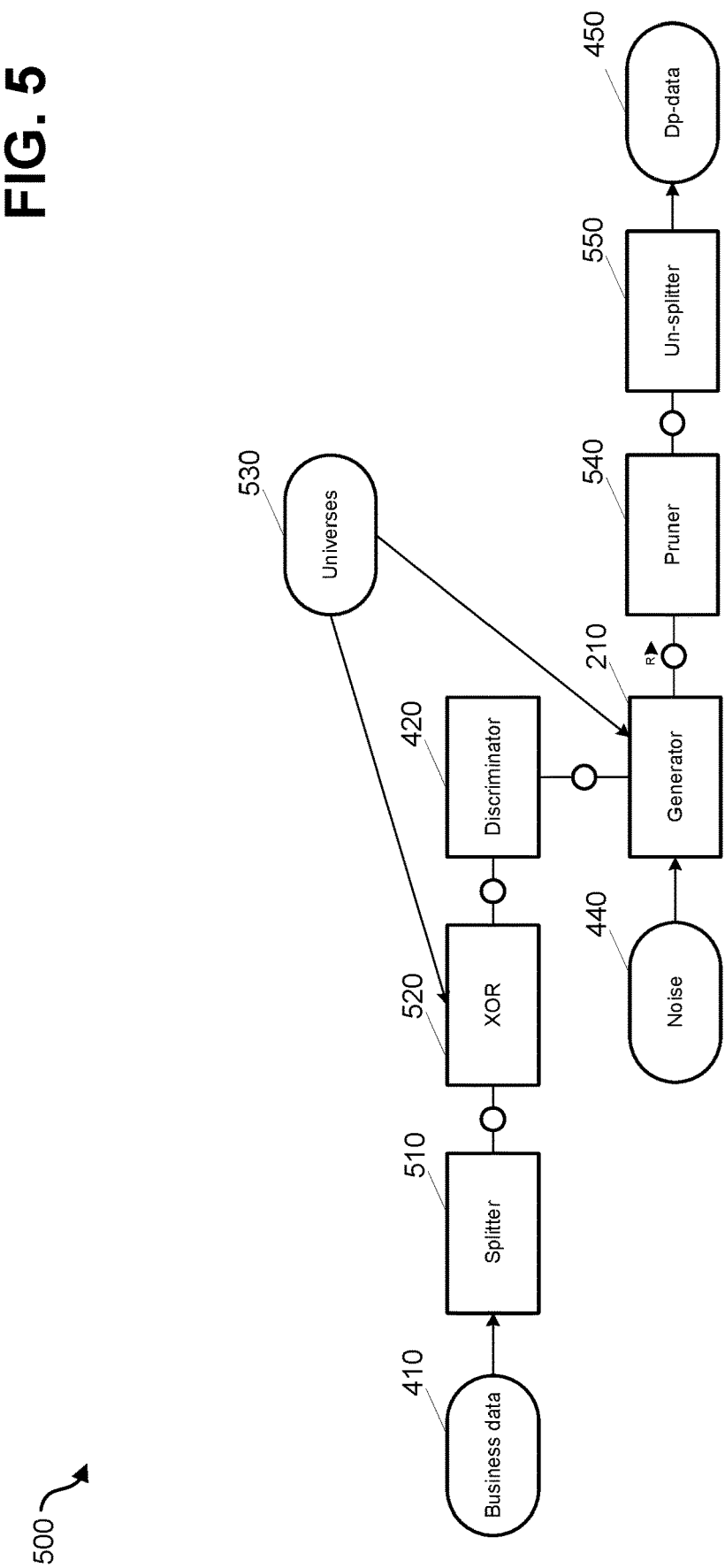
FIG. 5 is a fourth process flow diagram illustrating aspects of generating fake data.

FIG. 5 is a diagram 500 illustrating a variation of the architecture of FIG. 4 further including a splitter 510, an XOR agent 520, universes 530, a pruner 540, and an un-splitter 550.

Before applying differential privacy, the splitter 510 can prepare the data 410 according to the 'split' operation 220 as described below. The splitter 510 can split complex fields as needed, to keep the cohesion between, for example, email and first name, or name and shipping address.

Once split, there can be final list of fields, which shall be configured according to the strategies xor, complete, or none. The fields with a strategy of xor and of complete are then possibly automatically assigned a dataset coming from a possible static source (or from a generator) which gets prepared as required: information from the data is removed from the universes for the xor fields, and added for the complete fields.

Then the xor agent 520 can replace xor fields with values from the corresponding universe 530. The result data is the input data for a DG-GAN solution, where the generator 430 is given extra pool values for the fields set to 'complete', such as first names.

The output data is sent to the pruner 540 for removing duplicates on-the-fly, then the un-splitter 550 can rebuild the complex fields because some data items can come from different database tables, may have been flattened during the initial steps of the data generation process.

Figure 6:
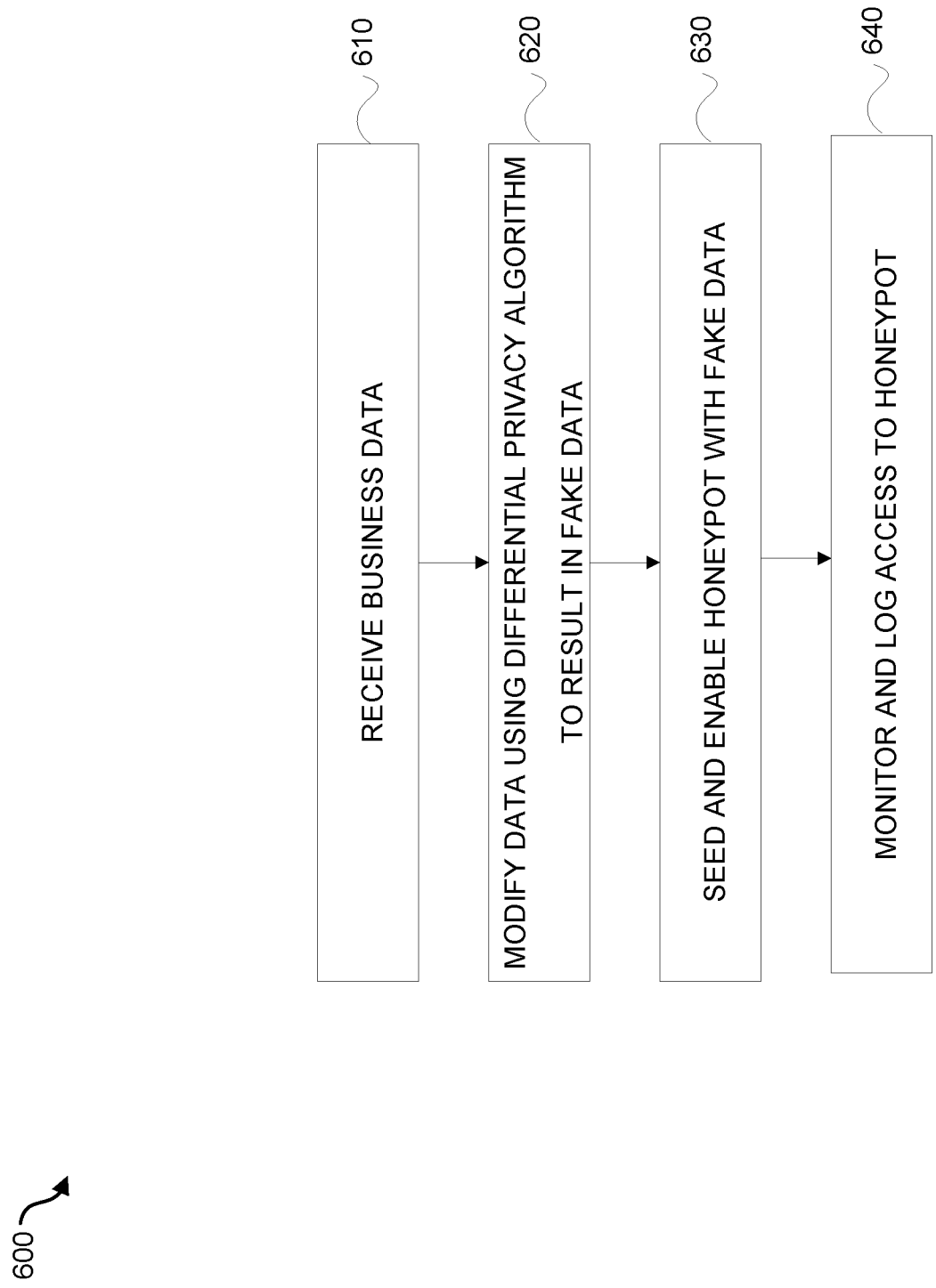
FIG. 6 is a process flow diagram illustrating the generation and monitoring of a honeypot seeded with fake data.

FIG. 6 is a process flow diagram 600 illustrating an arrangement in which, at 610, data is received that includes a plurality of fields. Thereafter, at 620, using at least one differential privacy algorithm, each of the plurality of fields within the data to result in fake data. This fake data is then used, at 630, to seed and enable a honeypot. After the honeypot is enabled, at 640, access to honeypot to monitored and logged in order to thwart subsequent malicious actors.

Figure 7:
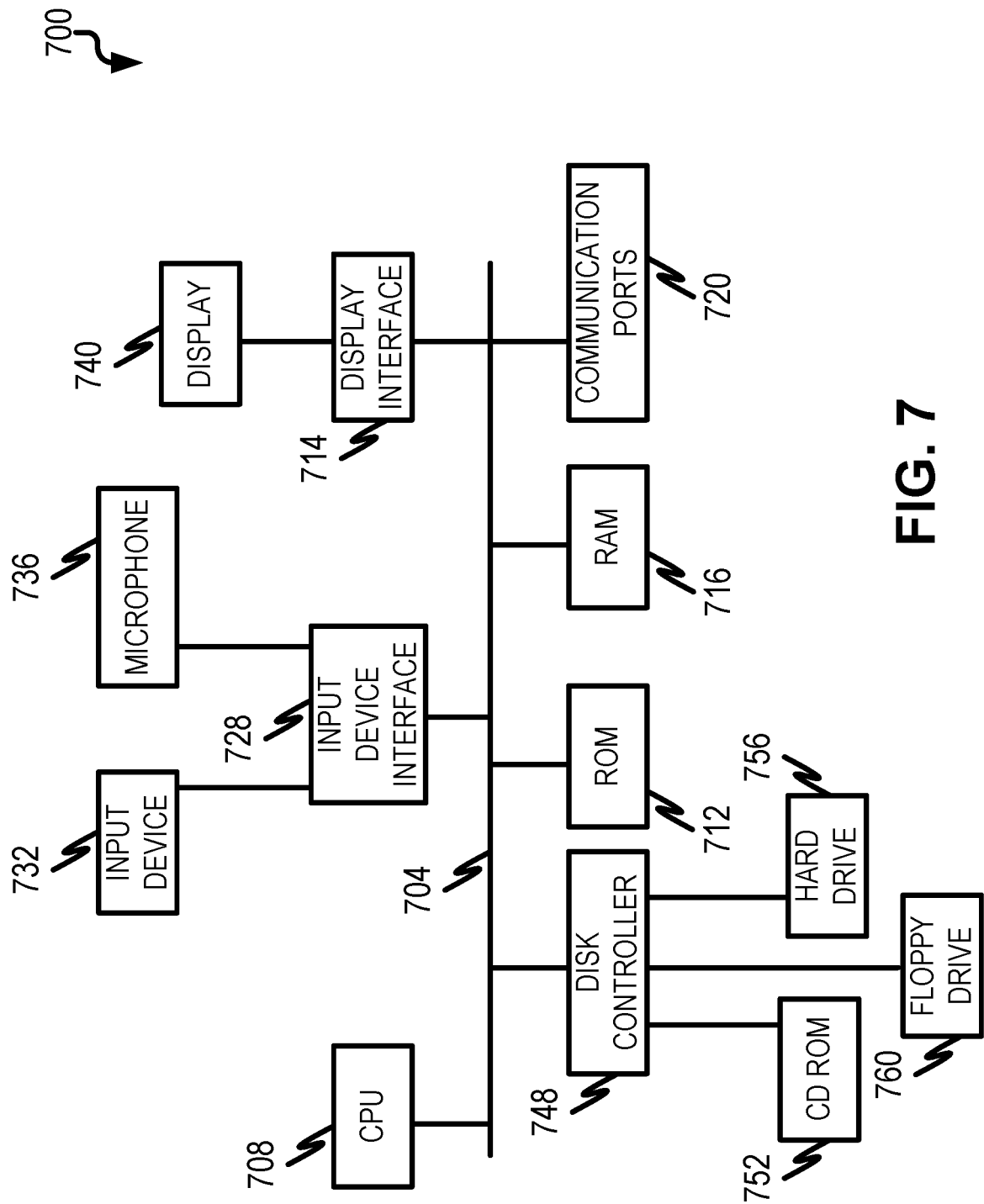
FIG. 7 is a diagram illustrating aspects of a computing device for implementing the subject matter described and illustrated herein.

FIG. 7 is a diagram 700 illustrating a sample computing device architecture for implementing various aspects described herein. A bus 704 can serve as the information highway interconnecting the other illustrated components of the hardware. A processing system 708 labeled CPU (central processing unit) (e.g., one or more computer processors/data processors at a given computer or at multiple computers), can perform calculations and logic operations required to execute a program. A non-transitory processor-readable storage medium, such as read only memory (ROM) 712 and random access memory (RAM) 716, can be in communication with the processing system 708 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 748 can interface with one or more optional disk drives to the system bus 704. These disk drives can be external or internal floppy disk drives such as 760, external or internal CD-ROM, CD-R, CD-RW or DVD, or solid state drives such as 752, or external or internal hard drives 756. As indicated previously, these various disk drives 752, 756, 760 and disk controllers are optional devices. The system bus 704 can also include at least one communication port 720 to allow for communication with external devices either physically connected to the computing system or available externally through a wired or wireless network. In some cases, the at least one communication port 720 includes or otherwise comprises a network interface.

To provide for interaction with a user, the subject matter described herein can be implemented on a computing device having a display device 740 (e.g., a CRT (cathode ray tube) or LCD (liquid crystal display) monitor) for displaying information obtained from the bus 704 via a display interface 714 to the user and an input device 732 such as keyboard and/or a pointing device (e.g., a mouse or a trackball) and/or a touchscreen by which the user can provide input to the computer. Other kinds of input devices 732 can be used to provide for interaction with a user as well; for example, feedback provided to the user can be any form of sensory feedback (e.g., visual feedback, auditory feedback by way of a microphone 736, or tactile feedback); and input from the user can be received in any form, including acoustic, speech, or tactile input. The input device 732 and the microphone 736 can be coupled to and convey information via the bus 704 by way of an input device interface 728. Other computing devices, such as dedicated servers, can omit one or more of the display 740 and display interface 714, the input device 732, the microphone 736, and input device interface 728.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for thwarting cybersecurity attacks comprising:
   receiving data comprising a plurality of fields;
   modifying, using at least one differential privacy generative adversarial network, each of the plurality of fields within the received data to result in fake data;
   seeding and enabling a honeypot using the fake data; and
   monitoring and logging access to the honeypot in order to thwart subsequent malicious actors.

2. The method of claim 1 wherein the modifying comprises:
   splitting complex fields within the received data.

3. The method of claim 2 further comprising:
   pruning the received data during modifying to remove duplicate fields.

4. The method of claim 3 further comprising:
   rebuilding the complex fields that were previously split.

5. The method of claim 1, wherein the at least one differential privacy generative adversarial network utilizes a generator to generate new data samples by mapping random noise into new data instances while capturing an original data distribution.

6. The method of claim 5, wherein the at least one differential privacy generative adversarial network utilizes a discriminator that attempts to distinguish the generated new data samples from real data samples.

7. The method of claim 6, wherein the discriminator further estimates a probability that a particular data sample comes from a training data set rather than the new data samples generated by the generator.

8. The method of claim 1 further comprising:
   receiving a first parameter defining a level of privacy;
   receiving a second parameter defining a data normalization parameter; and
   configuring the differential privacy generative adversarial network using the first parameter and the second parameter.

9. The method of claim 1 further comprising:
   replacing certain fields within the data using universes, the universes being dictionaries bound to the certain fields, the dictionaries comprising a pre-defined set of fields not in the received data.

10. A system for thwarting cybersecurity attacks comprising:
    at least one data processor; and
    memory storing instructions which, when implemented by the at least one data processor, result in operations comprising:
      receiving data comprising a plurality of fields;
      modifying, using at least one differential privacy generative adversarial network (dp-GAN), each of the plurality of fields within the received data to result in fake data;
      seeding and enabling a honeypot using the fake data; and
      monitoring and logging access to the honeypot in order to thwart subsequent malicious actors.

11. The system of claim 10 wherein the modifying comprises:
    splitting complex fields within the received data.

12. The system of claim 11, wherein the operations further comprise:
    pruning the received data during modifying to remove duplicate fields.

13. The system of claim 12, wherein the operations further comprise:
    rebuilding the complex fields that were previously split.

14. The system of claim 10, wherein the at least one differential privacy generative adversarial network utilizes a generator to generate new data samples by mapping random noise into new data instances while capturing an original data distribution.

15. The system of claim 14, wherein the at least one differential privacy generative adversarial network utilizes a discriminator that attempts to distinguish the generated new data samples from real data samples.

16. The system of claim 15, wherein the discriminator further estimates a probability that a particular data sample comes from a training data set rather than the new data samples generated by the generator.

17. A non-transitory computer program product storing instructions which, when executed by at least one data processor forming part of at least one computing device, result in operations for thwarting a cybersecurity attack comprising:
    receiving data comprising a plurality of fields;
    modifying, using at differential privacy generative adversarial network, each of the plurality of fields within the received data to result in fake data;
    seeding and enabling a honeypot using the fake data; and
    monitoring and logging access to the honeypot in order to thwart subsequent malicious actors.

18. The computer program product of claim 17 wherein the modifying comprises:
    splitting complex fields within the received data;
    pruning the received data to remove duplicate fields;
    rebuilding the complex fields that were previously split.

19. The computer program product of claim 18, wherein the discriminator further estimates a probability that a particular data sample comes from a training data set rather than the new data samples generated by the generator.

20. The computer program product of claim 17, wherein the differential privacy generative adversarial network utilizes a generator to generate new data samples by mapping random noise into new data instances while capturing an original data distribution, and a discriminator that attempts to distinguish the generated new data samples from real data samples.

* * * * *